(12) United States Patent
Bögershausen et al.

(10) Patent No.: US 11,260,439 B2
(45) Date of Patent: Mar. 1, 2022

(54) ALUMINUM ALLOY STRIP WITH IMPROVED SURFACE APPEARANCE

(71) Applicants: Dieter Bögershausen, Grevenbroich (DE); Jochen Schwarz, Wassenberg (DE); Bernhard Kernig, Cologne (DE); Kathrin Eckhard, Bonn (DE); Axel Blecher, Niederkassel (DE); Olaf Güßgen, Langenfeld (DE)

(72) Inventors: Dieter Bögershausen, Grevenbroich (DE); Jochen Schwarz, Wassenberg (DE); Bernhard Kernig, Cologne (DE); Kathrin Eckhard, Bonn (DE); Axel Blecher, Niederkassel (DE); Olaf Güßgen, Langenfeld (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 1975 days.

(21) Appl. No.: 14/448,244

(22) Filed: Jul. 31, 2014

(65) Prior Publication Data

US 2014/0341678 A1    Nov. 20, 2014

Related U.S. Application Data

(63) Continuation of application No. PCT/EP2013/051250, filed on Jan. 23, 2013.

(30) Foreign Application Priority Data

Feb. 2, 2012  (EP) ..................................... 12153618
Jul. 17, 2012  (EP) ..................................... 12176752

(51) Int. Cl.
*C22C 21/00*  (2006.01)
*B21B 45/02*  (2006.01)
(Continued)

(52) U.S. Cl.
CPC ............ *B21B 45/0269* (2013.01); *B21B 1/22* (2013.01); *B21B 45/0239* (2013.01);
(Continued)

(58) Field of Classification Search
CPC ....... C22C 21/00; C22C 21/003; C22C 21/02; C22C 21/04; C22C 21/06; C22C 21/08;
(Continued)

(56) References Cited

U.S. PATENT DOCUMENTS 3,793,184 A * 2/1974  Loftus ................. B21B 45/0296
                                                                      208/183
4,477,290 A   10/1984  Carroll et al.
(Continued)

FOREIGN PATENT DOCUMENTS

DE  43 17 815 C1  6/1994
EP  0257957 A1  3/1988
(Continued)

OTHER PUBLICATIONS

M. Bloeck, "Aluminium Sheet for Automotive Applications", Advanced Materials in Automotive Engineering, first edition, Woodhead Publishing, Feb. 21, 2012, pp. 85-108, 31 pages.
(Continued)

*Primary Examiner* — Michael E. La Villa
(74) *Attorney, Agent, or Firm* — Reinhart Boerner Van Deuren P.C.

(57) ABSTRACT

The invention relates to an aluminum alloy strip with improved surface optics, which is fabricated via hot and/or cold rolling, and consists of a type AA 3xxx, AA 5xxx, AA 6xxx or AA 8xxx aluminum alloy. The object of proposing an aluminum alloy strip that is suitable for attractive and precious surface optics despite the elevated percentage of alloy constituents is achieved in that, after degreasing, the finish-rolled aluminum alloy strip exhibits an increase in the
(Continued)

luminance value L*(ΔL) in relation to the rolled-greasy state of more than 5 while measuring the color of the surface in the CIE L*a*b* color space using a standard illuminant D65 and a normal observation angle of 10°, excluding direct reflection in 45°/0° geometry.

3 Claims, 2 Drawing Sheets

(51) Int. Cl.
| | |
|---|---|
| B21B 1/22 | (2006.01) |
| C23C 22/78 | (2006.01) |
| C23G 1/00 | (2006.01) |
| C23G 1/22 | (2006.01) |
| C22F 1/04 | (2006.01) |
| C23C 22/82 | (2006.01) |
| C23C 30/00 | (2006.01) |
| C23C 22/83 | (2006.01) |
| C22C 21/14 | (2006.01) |
| C22C 21/06 | (2006.01) |
| C22C 21/12 | (2006.01) |
| C22C 21/04 | (2006.01) |
| C22C 21/08 | (2006.01) |
| C22C 21/16 | (2006.01) |
| C22C 21/02 | (2006.01) |
| C22C 21/10 | (2006.01) |
| C22C 21/18 | (2006.01) |
| B21D 51/26 | (2006.01) |
| G01J 3/46 | (2006.01) |

(52) U.S. Cl.
CPC .............. *B21D 51/26* (2013.01); *C22C 21/00* (2013.01); *C22C 21/003* (2013.01); *C22C 21/02* (2013.01); *C22C 21/04* (2013.01); *C22C 21/06* (2013.01); *C22C 21/08* (2013.01); *C22C 21/10* (2013.01); *C22C 21/12* (2013.01); *C22C 21/14* (2013.01); *C22C 21/16* (2013.01); *C22C 21/18* (2013.01); *C22F 1/04* (2013.01); *C23C 22/78* (2013.01); *C23C 22/82* (2013.01); *C23C 22/83* (2013.01); *C23C 30/00* (2013.01); *C23C 30/005* (2013.01); *C23G 1/00* (2013.01); *C23G 1/22* (2013.01); *B21B 2001/221* (2013.01); *G01J 3/46* (2013.01); *Y10T 428/12* (2015.01); *Y10T 428/1259* (2015.01); *Y10T 428/12431* (2015.01); *Y10T 428/12438* (2015.01); *Y10T 428/12556* (2015.01); *Y10T 428/12569* (2015.01); *Y10T 428/12597* (2015.01); *Y10T 428/12604* (2015.01); *Y10T 428/12611* (2015.01); *Y10T 428/12618* (2015.01); *Y10T 428/12736* (2015.01); *Y10T 428/12993* (2015.01); *Y10T 428/2495* (2015.01); *Y10T 428/24967* (2015.01); *Y10T 428/26* (2015.01); *Y10T 428/263* (2015.01); *Y10T 428/264* (2015.01); *Y10T 428/265* (2015.01); *Y10T 428/31678* (2015.04)

(58) Field of Classification Search
CPC ......... C22C 21/10; C22C 21/12; C22C 21/14; C22C 21/16; C22C 21/18; C23C 22/78; C23C 22/82; C23C 22/83; C23C 30/00; C23C 30/005; C22F 1/04; C23G 1/00; C23G 1/22; Y10T 428/12; Y10T 428/31678; Y10T 428/12736; Y10T 428/12556; Y10T 428/2495; Y10T 428/12569; Y10T 428/1259; Y10T 428/24967; Y10T 428/12597; Y10T 428/12604; Y10T 428/263; Y10T 428/12611; Y10T 428/12618; Y10T 428/264; Y10T 428/12431; Y10T 428/12438; Y10T 428/265; Y10T 428/12993; Y10T 428/26; B21B 45/0239; B21B 45/0269; B21B 2001/221; B21B 51/26; B21B 1/22; G01J 3/46
See application file for complete search history.

(56) References Cited

U.S. PATENT DOCUMENTS

| | | | |
|---|---|---|---|
| 4,762,638 A | | 8/1988 | Dollman et al. |
| 5,032,303 A | * | 7/1991 | Bondpa ............... C10M 129/34 508/268 |
| 5,114,607 A | | 5/1992 | Deck et al. |
| 5,380,468 A | | 1/1995 | Gober et al. |
| 2009/0220714 A1 | * | 9/2009 | Nishida ..................... B32B 1/02 428/35.7 |
| 2010/0243108 A1 | | 9/2010 | Karabin et al. |
| 2013/0032602 A1 | * | 2/2013 | Golding ............... B21D 22/208 220/604 |

FOREIGN PATENT DOCUMENTS

| | | | |
|---|---|---|---|
| GB | | 2148942 A | 6/1985 |
| UA | | 82 859 C2 | 5/2008 |
| WO | WO 2006/122852 A1 | | 11/2006 |
| WO | WO 2007/045676 A1 | | 4/2007 |
| WO | WO 2007/141300 A1 | | 12/2007 |
| WO | WO 2010/108953 A1 | | 9/2010 |
| WO | WO 2011/090692 A2 | | 7/2011 |

OTHER PUBLICATIONS

P. Premendra et al., "The Importance of the Near-Surface Region in the Surface Pre-Treatment of Rolled Recycled Aluminium", Innovative Pre-Treatment Techniques to Prevent Corrosion of Metallic Surfaces, European Federation of Corrosion Publications, No. 54, pp. 71-82, Woodhead Publishing, 2007, 14 pages.

* cited by examiner

ALUMINUM ALLOY STRIP WITH IMPROVED SURFACE APPEARANCE

CROSS-REFERENCE TO RELATED PATENT APPLICATIONS

This patent application is a continuation of PCT/EP2013/051250, filed Jan. 23, 2013, which claims priority to European Application No. 12153618.9, filed Feb. 2, 2012 and European Application No. 12176752.9, filed Jul. 17, 2012, the entire teachings and disclosure of which are incorporated herein by reference thereto.

FIELD OF THE INVENTION

The invention relates to an aluminum alloy strip or sheet with improved surface optics, which is fabricated via hot and/or cold rolling, and consists of a type AA 3xxx, AA 5xxx, AA 6xxx or AA 8xxx aluminum alloy. In addition, the invention relates to a method for manufacturing an aluminum alloy strip with improved surface optics, as well as to the use of a corresponding aluminum alloy strip.

BACKGROUND OF THE INVENTION

Strips consisting of a type AA 3xxx, AA 5xxx, AA 6xxx or AA 8xxx aluminum alloy are often used for applications in which the surfaces of the aluminum alloy strip on the finished product remain visible. For example, can lids are fabricated out of a type AA5182 aluminum alloy, and coated with a clear varnish or gold-tinted clear varnish. The corresponding can lids then exhibit the surface optics of the completely finished aluminum alloy strip, or allow the latter to be visible through the tinted varnish. Other aluminum alloy strips are also delivered in varnished form, e.g. those consisting of an AA 3xxx aluminum alloy. For example, top-coat varnished strips of this aluminum alloy are used for manufacturing roller shutters or skylight strips. AA 8xxx aluminum alloys are used among other things for packaging purposes, in particular blister packaging.

When manufacturing the aluminum alloy strip, rolling oil is used in particular during the rolling operations, and incorporated along with other particles into the surface of the aluminum alloy strip as the result of the rolling operations. In particular the more recent rolling oils and rolling emulsions that satisfy tougher environmental requirements prove disadvantageous with respect to the surface optics of the fabricated aluminum alloy strip. The new rolling emulsions or rolling oils yielded problems during ensuing surface treatment operations, in particular surface passivation or also surface varnishing, so that rejects were produced, or the strips had to be subjected to renewed cleaning. Rolling can also be followed by heat treatments, preferably annealing, e.g., intermediate annealing or final annealing, so as to change the aluminum alloy strips into a specific structural state. The problem here had previously been that annealing in particular causes magnesium constituents to become enriched in areas of the strips near the surfaces. High magnesium contents at the surface, whether stemming from a possible heat treatment or the (hot) rolling process, or generally owing to the alloy composition, lead to a darker surface of the aluminum alloys strip, so that the aluminum alloy strip exhibits dark surface optics even after a degreasing. As a result, correspondingly dark aluminum alloy strips could not be easily processed into products with surfaces that appeared bright and precious. For example, fluctuations in the course of processing additionally lead to visibly different surface optics, e.g., in various coils of the same aluminum alloy. Given a fluctuation in process parameters during production, the strip assumes an in part spotty appearance, which results in rejects, for example during the production of products coated with clear varnish. Conventional degreasing processes had previously been used for the mentioned aluminum alloy strips, and while they did remove the rolling oil sufficiently from the surface of the aluminum alloy strip, they were unable to influence surfaces that had become darker, in particular as the result of magnesium enrichment. This phenomenon was encountered in particular in the higher alloyed type AA 3xxx, AA 5xxx, AA 6xxx and AA 8xxx aluminum alloy strips. Products that were subsequently coated with a clear varnish or tinted clear varnish exhibit varying surface optics, since the varnished surfaces have either a darker or brighter effect, depending on which surface optics the aluminum alloy layer present under the varnish had. This also holds true for products made out of the aluminum alloy strips that exhibit only surface passivation. In addition, conventional degreasing made it necessary to adjust the productivity, i.e., processing rate, to the respective strip state, i.e., for example the rolling oil application.

SUMMARY OF THE INVENTION

Proceeding from the above, the object of the present invention is to propose an aluminum alloy strip or sheet that exhibits improved, in particular "precious", surface optics despite the elevated percentage of alloy constituents. In addition, the object of the invention is to propose a method for manufacturing a corresponding aluminum alloy strip as well as advantageous uses of the aluminum alloy strip.

According to a first teaching of the present invention, the specified object is achieved in that, after degreasing, the finish-rolled aluminum alloy strip exhibits an increase in the luminance value $L^*$ in relation to the rolled-greasy state of more than 5 while measuring the color of the surface in the CIE $L^*a^*b^*$ color space using a standard illuminant D65 and an observation angle of 10°, excluding direct reflection by a measurement in 45°/0° geometry.

As explained, the surfaces of aluminum alloy strips that are relatively high-alloyed exhibit a relatively dark surface due to enrichment phenomena in the surface. Even though the mentioned type AA 3xxx, AA 5xxx, AA 6xxx or AA 8xxx aluminum alloys have elevated percentages of alloy constituents, in particular magnesium, manganese or even silicon, the aluminum alloy strip according to the invention exhibits a clearly increased luminance value $L^*$ in the CIE $L^*a^*b^*$ color space after degreasing. As a consequence, the surfaces of the aluminum alloy strips according to the invention are brighter by comparison to conventional strips made out of identical aluminum alloys.

The $L^*a^*b^*$ color system describes a standardized color space in which the colors green and red oppose each other on the $a^*$ axis and the colors blue and yellow correspondingly on the $b^*$ axis. The goal of the $L^*a^*b^*$ color space is to quantify the physiological color impression and represent it in uniform intervals in a diagram. The $L^*$ axis is situated perpendicular on this plane, and reflects the brightness, i.e., the surface brightness becomes measurable in this color space regardless of the measured color values. The $L^*$ axis is a gauge for surface brightness, since the $L^*$ axis has $L=0$ as the endpoint for black, and $L=100$ as the endpoint for white. All intermediate values between $L=0$ and $L=100$ are designated as nonchromatic gray tones. The higher the luminance value $L^*$ now becomes, the brighter the surface impression.

All luminance values L* cited in the patent application relate to a measurement performed with a standard light source that emits standard illuminant D65 according to ISO 3664. The latter exhibits a spectral radiation distribution with a color temperature of 6500 K, which roughly corresponds to daylight given a cloudy sky. The luminance values were further determined for 10° normal observers in a 45 circ./0 geometry.

During such a measurement, conventional aluminum alloy strips previously reached luminance values of below 40, and exhibit only marginal differences in surface brightness, in particular between the rolled-greasy state and degreased state. In order to measure the surface brightness, a 45°/0° measurement is performed at a 45° angle while excluding direct reflection. For example, the sample is here irradiated with the cited standard light source at an angle of 45°, and the scattered radiation that scatters perpendicular to the irradiated surface of the sample is measured with a spectrometer. It is basically also possible to irradiate the sample perpendicularly, and measure the light scattered at an angle of 45°. For transformation into the L*a*b* CIE color space, the scattered light is decomposed into the spectral colors, so as to generate the corresponding values for the L*a*b* color space from them. The luminance values L* are here independent of device, and provide an exact gauge for the surface brightness as it appears to an observer.

The aluminum alloy strip surfaces according to the invention exhibit a clearly brighter surface in the degreased state than do conventional alloy strips. Specifically, the aluminum alloy strip according to the invention exhibits an increase in luminance values L* by more than 5, preferably more than 6, and especially preferably more than 10 in a comparison between the rolled-greasy and degreased strip. The usual increases between the rolled-greasy and degreased state had previously been at L* values of 1.5. The increase in luminance values L* by more than 5 is clearly visible, so that the surface optics of the aluminum alloy strips according to the invention clearly have a more precious and brighter surface optics. They are easy to use and further process for highly decorative surfaces, specifically without any special surface treatment.

If the aluminum alloy strip consists of a type AA5xxx, in particular AA 5182, aluminum alloy, the aluminum alloy strip reaches a luminance value L* of greater than 40. In this regard, the aluminum alloy strip is distinguished by an especially bright surface, which stems from the clear rise in luminance values L* from the rolled-greasy to degreased state. Aluminum alloy strips made out of AA 5182 could previously not be fabricated with these luminance values, i.e., with these precious and bright surface optics.

If the aluminum alloy strips consisting of a type AA5xxx, in particular type AA 5182, aluminum alloy are coated with a clear varnish or a tinted clear varnish, a luminance value L* of at least 52, preferably of at least 55, can be measured after varnishing. The increase in luminance values L* after varnishing as compared to the rolled-greasy state is especially high in the aluminum alloy strip according to the invention. The luminance values L* increased by more than 15.

In a next embodiment of the aluminum alloy strip according to the invention, the aluminum alloy strip can be intermediately and/or finally annealed. Both heat treatments can lead to a distinct enrichment of Mg atoms in the surface area of the strips, making the latter darker. Aluminum alloys with a high content of Mg generally leave a dark surface impression owing to the rolling process. However, even at high Mg contents on the surface, the aluminum alloy strip according to the invention exhibits an increase in the luminance value L* of more than 5, preferably 6, or especially preferred more than 10, since the enriched surface areas are exposed to pickling.

The aluminum alloy strip according to the invention is advantageous even in cases where the aluminum alloy strip is varnished or top-coat varnished, since the varnish adheres better to the brighter, i.e., cleaner surface. In addition, it is also advantageous for the aluminum alloy strip to exhibit a passivated surface, so as to facilitate ensuing procedural steps, e.g., varnishing. For example, passivation can take place via chromating or chromium-free passivation based on Zr and/or Ti. The application process is preferably a "no-rinse" process or an immersion process.

Since the aluminum alloy strip according to the invention is often used as a packaging material, a surface part or structural part, it is advantageous if the aluminum alloy strip exhibits a thickness of 0.05 mm to 0.9 mm. For example, the very slight thicknesses of 0.05 mm are used to prepare blister packaging made out of a corresponding aluminum alloy strip. By contrast, the larger strip thicknesses of about 0.9 mm are encountered in applications involving a skylight strip, for example. Average strip thicknesses of 0.2 to 0.5 mm are preferably used for can lids or the lid strip. The same also holds true for the can strap.

In a second teaching of the present invention, the specified object is achieved using a method for manufacturing an aluminum alloy strip with improved surface optics, in which the aluminum alloy strip is fabricated out of a type AA 3xxx, AA 5xxx, AA 6xxx or AA 8xxx aluminum alloy, and exposed at least to cold rolling with the use of a rolling oil, in that the cold-rolled aluminum alloy strip is subjected to degreasing with the use of an alkaline pickle after cold rolling, after which the aluminum alloy strip goes through an acid rinse.

The properties of the alkaline pickle involve not just removing the rolling oil, but simultaneously by a pickling attack on the surface of the aluminum alloy strip performing a specific removal by pickling. In addition, exposure to the pickle also removes layers near the surface with high Mg contents, so that the layers lying underneath come to the fore. However, rolled-in magnesium oxide particles, which can also disrupt the optics, are also removed. The alkali concentration is here preferably selected in such a way that the pickle acts uniformly, and the pickling rate is adjusted to the desired degree of brightness for the surface of the aluminum alloy strip. The subsequent acid rinse removes the stripped particles and surface residues from the aluminum alloy strip, thereby preventing the stripped particles from occupying the surface. The acid rinse usually involves the use of mineral acids. However, other acids can basically be used as well. As a result, a brighter or more precious surface of the aluminum alloy strip is left behind. The surface does not change over the length of the aluminum alloy strip, since no additional rolling steps and surface impairments take place. In particular, it was surprisingly found that using this alkaline pickle above all in higher alloyed aluminum alloy strips, for example a type AA 5182 type aluminum alloy, leads to a clear improvement in surface optics or distinct brightening of the surface. At the same time, the more brilliant surface optics of the aluminum alloy strip fabricated according to the invention clearly makes the entire surface of the aluminum alloy strip more uniform, so that higher luminance values are achieved over the entire strip length. As already explained, the increase in luminance value L* measured more than 5, preferably more than 6 or 10.

In a first embodiment of the method according to the invention, especially good and procedurally reliable results were achieved in relation to the improved surface optics by having the alkaline pickle encompass the following constituents: at least 1.5 to 3 wt % of a mixture of 5 to 40 wt % sodium tripolyphosphate, 3 to 10 wt % sodium gluconate, 3 to 8 wt % nonionic and anionic surfactant, optionally 0.5 to wt % sodium carbonate, preferably 30 to 70 wt % sodium carbonate, wherein caustic soda lye is added to the aqueous solution, so that the caustic soda lye concentration measures 0.2 to 2.5 wt %. It was shown that using this alkaline pickle can yield an excellent degreasing accompanied simultaneously by a sufficiently extensive action by the pickle on the surface of the aluminum alloy strip, so that an aluminum alloy strip with improved surface optics can be provided as a result. Preferably, a caustic soda lye concentration of 0.2 to 1.5 wt % is used. This results in a controlled pickling attack.

It has further been shown that the retention time of the aluminum alloy strip in the degreasing medium primarily measures 1 to 8 s, preferably 2 to 6 s. As already explained, this retention time makes it possible to sufficiently degrease and pickle the surface of the aluminum alloy strip, while at the same time enabling a highly automated process with a sufficient production rate.

The retention time of the aluminum alloy strip in the degreasing medium can be lowered by having the degreasing medium exhibit a temperature of 60 to 80° C., preferably 65° C. to 75° C. The elevated temperature leads to a higher reactivity of the degreasing medium, and hence to a more intensive pickling attack.

In addition, good results could be achieved relative to providing a brighter surface of the aluminum alloy strip by rinsing the degreased aluminum alloy strip with acid using nitric acid or sulfuric acid. In the course of rinsing, both acids adequately remove the surface coating of the aluminum alloy strip, thereby making it possible to provide a very clean, bright surface in a reliable process. The concentration of nitric acid preferably measures 1 to 4 wt %, while that of sulfuric acid preferably measures 1 to 3 wt %. The mentioned acid concentrations enable a thorough cleaning of the alkaline-pickled strips at a high processing rate.

In another embodiment of the method according to the invention, degreasing and rinsing are followed by surface passivation, for example through chromating or chromium-free passivation based on Zr and/or Ti. Of course, other passivation methods are also conceivable. A no-rinse method is here preferably used for applying the surface passivation. Surface passivation simplifies ensuing procedural steps, for example varnishing the surface, and also ensures sufficient protection against additional influences on surface quality. In addition, it was shown that process reliability is distinctly higher during the passivation of aluminum alloy strips degreased according to the invention. Surface passivation preferably takes place "inline" with the degreasing and rinsing process. As a consequence, "inline" surface passivation takes place immediately after the degreased strip has been rinsed in the same system, without winding up the strip prior to surface passivation. This makes it possible to preserve the surface state of the aluminum alloy strip in an optimal fashion.

The aluminum alloy strip is preferably varnished with or without surface passivated surface after degreasing. For example, a tinted clear varnish, a clear varnish or a top-coat varnish can be used to provide the corresponding optics. Varnishing can also take place "inline" with degreasing and rinsing, as well as optionally with passivation. However, the aluminum alloy strip can also be first passivated and then wound up into a storable coil, so that it can be forwarded to a varnishing operation later. Due to the optimized degreasing, all surfaces coated with a clear varnish or tinted clear varnish exhibit an increase in the luminance values $L^*$ in the finished aluminum alloy strip. Both top-coat varnishing and clear varnish coatings can be performed "inline" within a higher degree of procedural reliability, since the aluminum alloy strip according to the invention has a uniform degreasing state.

Finally, the object described at the outset is achieved by the use of the aluminum alloy strip according to the invention for manufacturing packaging, cans, can lids, blister packaging, skylights, shutter wands and panels, composites, valve disk lids and containers. The cited applications for the aluminum alloy strip according to the invention share in common that they involve surface-sensitive products, since surface defects or fluctuations in surface quality lead directly to production rejects. The more precious and uniform surface is advantageous for visible aluminum surfaces. At the same time, the varnished products benefit from the procedurally reliable and faster degreasing of the aluminum alloy strip and the high procedural reliability during subsequent varnishing.

BRIEF DESCRIPTION OF THE DRAWINGS

In the following, the invention will be explained in greater detail based on exemplary embodiments in conjunction with the drawing. The drawing shows.

DETAILED DESCRIPTION OF THE INVENTION

Figure 1:
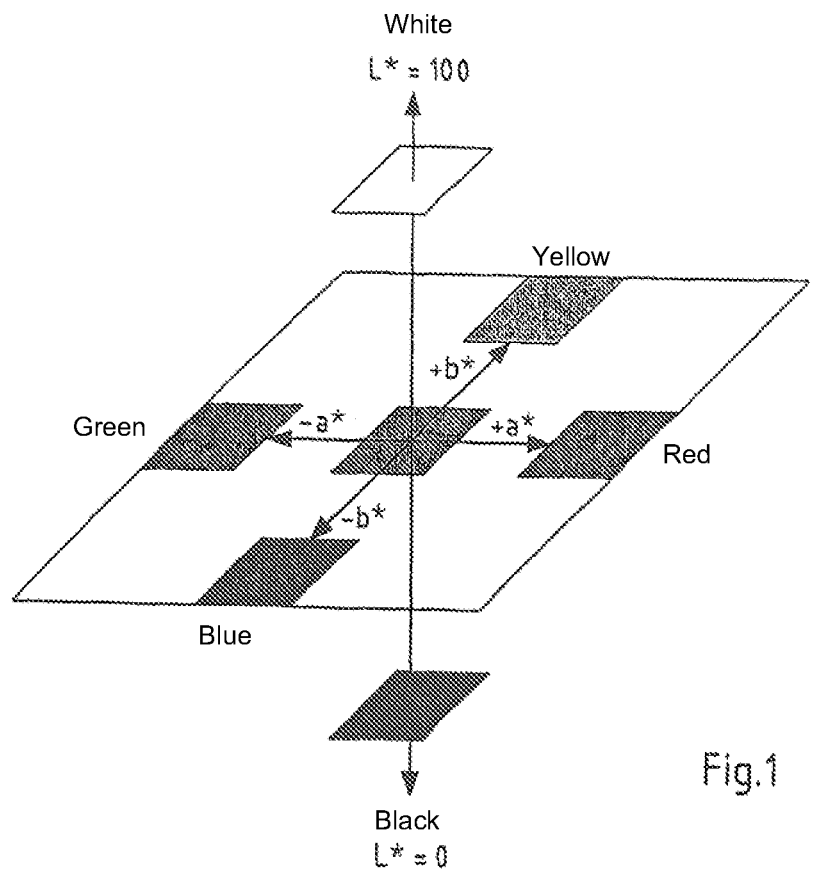
FIG. 1 a schematic depiction of the $L^*a^*b^*$-CIE color space.

FIG. 1 first presents a view of the CIE $L^*a^*b^*$ color space in a diagram. The CIE $L^*a^*b$ color space is based on the identically named color model, independent of device and stipulated in German Standard DIN 6174 under the title "Colorimetric Determination of Chromaticity and Color Differences in the approximately Uniform CIE $L^*a^*b$ Color Space". The coordinates of the $L^*a^*b$ color point are oriented toward the physiological characteristics of human perception, in particular color perception, and indirectly based on physical color stimulus specifications. As evident on FIG. 1, the $L^*a^*b^*$ color space is described by a three-dimensional coordinate system, in which the $a^*$ axis describes the red or green portion of a color, and the $b^*$ axis describes the blue or yellow portion. The scale values for the $a^*$ axis and $b^*$ axis encompass a numerical range of approx. −100 to approx. +100. The $L^*$ axis describes the brightness, the luminance, of the color using values of 0 to 100. In this case, the color black stands for 0, and the color white stands for 100. Because the $L^*a^*b^*$ color space is independent of device, the luminance values can be used to determine the brightness of the surface of the aluminum alloy strip independent of device.

Figure 2:
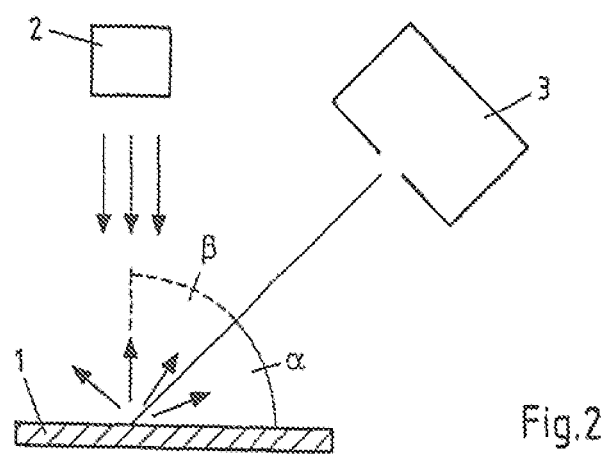
FIG. 2 a schematic depiction of the measuring arrangement for determining the luminance values $L^*$, and FIG. 3 a schematic depiction of a device for degreasing an aluminum alloy strip according to the invention.

The test assembly schematically depicted on FIG. 2 was used for this purpose. The aluminum alloy strip specimen 1 shown on FIG. 2 is illuminated by means of a standard light source. As already mentioned above, the luminance values $L^*$ were measured using standard illuminant D65 according to ISO 3664 at an observation angle of 10°. The scattered light of the standard light source 2 emitted by the specimen at an angle β is captured and measured with a spectrometer 3. The angle β measures 45°, making it possible to measure in particular surface effects responsible for the brightness impression, which affect the luminance values L*. As evident from the arrangement on FIG. 2, the spectrometer 3 does not acquire the directly reflected light, but rather only the light scattered from the surface. The spectrometer 3 then decomposes the measured light distribution into the individual color values, and generates the L*a*b* color space values. Of course, the spectrometer 3 was calibrated to the standard light source 2 for this purpose, allowing it to take into account the influence exerted by the spectral distribution of the light emitted by the standard light source 2 on the color space measurement. As already explained, the measured values are independent of device, and thus objectively stand for the physical appearance of the aluminum alloy strip surface.

Figure 3:
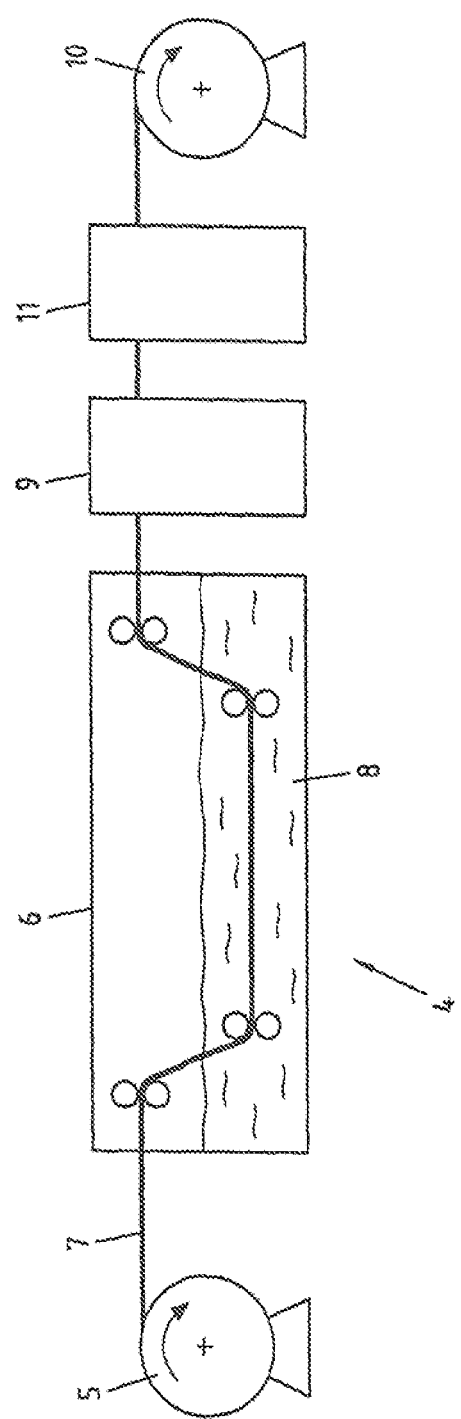

The measured specimens were derived from aluminum alloy strips, for example those degreased with a degreasing device 4 schematically depicted on FIG. 3. A coil is unwound onto a decoiler 5 for degreasing purposes. The unwound aluminum alloy strip 7 then passes through an immersion bath 6, in which the aluminum alloy strip 7 is guided through the degreasing medium 8. As an alternative to the immersion bath 6, a not shown spray device can also be provided, which sprays the degreasing medium onto the strip surface. The aluminum alloy strip 7 then also runs through a rinsing device 9, so as to remove the surface accumulation and residual degreasing medium from the aluminum alloy strip in an acid rinse, in which, for example, a concentration of 2.5 wt % nitric acid or 2 wt % sulfuric acid in an aqueous solution is used, as already explained. The pH value of the acid rinse preferably measured less than 3. The aluminum alloy strip 7 is then preferably relayed to surface passivation 11. In these examples, the surface of the aluminum alloy strip 7 was chromated or passivated in a no-rinse process. For example, passivation makes it possible to preserve the state of the strip surface, i.e., the improved surface optics, for other processes, for example varnishing. After drying the aluminum alloy strip 7 in a not shown dryer, it can then be wound onto the coiler 10, from which the measured specimens were taken.

In the performed tests, the temperature of the degreasing medium measured 70° C., and the retention time of the aluminum alloy strip in the degreasing medium measured about 2 s to 6 s. The same parameters were used to initially subject a type AA 5182 aluminum alloy strip to conventional degreasing, which was followed by a color measurement of the surface. The same then took place using an alkaline pickle, specifically in test 1 with the addition of 0.25 wt % caustic soda lye, in test 2 with the addition of 0.5 wt % caustic soda lye, in test 3 with the addition of 0.75 wt % caustic soda lye, and in test 4 with the addition of 1 wt % caustic soda lye, while retaining the temperature and duration of degreasing.

In addition, the specimens were measured in a rolled-greasy state, in a degreased state, varnished with clear varnish or with tinted clear varnish, here referred to as "gold varnish". The results are presented in Table 1.

As clearly evident from Table 1, the luminance value hardly increases during conventional degreasing from the rolled-greasy to the degreased state. The rise in the luminance value L* during conventional degreasing was below 1.39, meaning below 2. The application of a clear varnish layer or tinted clear varnish layer onto the conventionally degreased aluminum alloy surface caused the luminance value L* to increase by values below 14.

TABLE 1

| Test | | L* | a* | b* | ΔL* |
|---|---|---|---|---|---|
| Conventional | rolled-greasy | 37.3 | 0.32 | −1.71 | |
| | Degreased | 38.69 | 0.11 | −2.29 | 1.39 |
| | Clear varnish | 51.27 | −0.15 | 0.62 | 13.97 |
| | Gold varnish | 49.7 | 0.37 | −1.77 | 12.41 |
| Test 1 | rolled-greasy | 36.16 | 0.45 | −1.69 | |
| 0.25 wt % NaOH | Degreased | 41.28 | 0.06 | −3.98 | 5.12 |
| Invention | Clear varnish | 53.65 | −0.04 | −3.12 | 17.49 |
| | Gold varnish | 56.16 | −1.03 | 2.97 | 20 |
| Test 2 | rolled-greasy | 36.92 | 0.51 | −1.7 | |
| 0.5 wt % NaOH | Degreased | 43.19 | −0.12 | −4.14 | 6.28 |
| Invention | Clear varnish | 55.2 | −0.35 | −3.46 | 18.29 |
| | Gold varnish | 57.07 | −1.17 | 2.55 | 20.15 |
| Test 3 | rolled-greasy | 37.13 | 0.38 | −1.73 | |
| 0.75 wt % NaOH | Degreased | 48.75 | −0.74 | −4.43 | 11.62 |
| Invention | Clear varnish | 57.69 | −0.59 | −3.77 | 20.56 |
| | Gold varnish | 58.44 | −1.42 | 2.49 | 21.31 |
| Test 4 | rolled-greasy | 37.53 | 0.25 | −1.67 | |
| 1 wt % NaOH | Degreased | 47.8 | −0.44 | −4.21 | 10.27 |
| Invention | Clear varnish | 58.14 | −0.69 | −4.09 | 20.61 |
| | Gold varnish | 58.33 | −1.78 | 2.02 | 20.81 |

By contrast, the test 1 to 4 revealed a distinct rise in luminance values L* by more than 5 in the degreased state already. As the stripping rate increased, i.e., as the caustic soda lye concentration increased, a rise in luminance values L* in the degreased state of more than 10 was found up until 0.75 wt % caustic soda lye by comparison to the rolled-greasy state. This represents a significant and clearly evident increase. The aluminum alloy surface has a distinctly brighter physical appearance, and can be better passivated and varnished. The rise in luminance values L* when using a clear varnish or tinted clear varnish then measured clearly in excess of 17, and peaked at over 20. In particular, it turned out that the rise in luminance values L* by comparison to conventionally degreased and varnished variants is identical to the increases in an unvarnished state. This means that the improved or brighter surface is also manifested in varnished variants.

The aluminum alloy strips according to the invention clearly exhibit improved surface optics with a distinctly brighter surface impression than conventional aluminum alloy strips consisting of the same aluminum alloy. The latter can be demonstrated by measurements in the CIE L*a*b* color space.

However, the distinctive feature of the surface not only lies in the improved optics, but also in the improved processability. It could also be determined that the process of passivating and/or varnishing correspondingly fabricated, optically bright aluminum alloys was distinctly more reliable, and nearly independent of the quality of the preliminary strip, and in particular its degree of contamination with rolling oil and the implemented heat treatment.

The invention claimed is:

1. An aluminum alloy strip or sheet, which is fabricated via hot and/or cold rolling under the usage of rolling oil, and consists of a type AA 5182 aluminum alloy,
    wherein,
        after degreasing with an alkaline pickle and a subsequent acid rinse of the aluminum alloy strip or sheet, the finished-rolled aluminum alloy strip or sheet exhibits a pickled surface without any varnish or other coating and an increase in the luminance value L* (ΔL) in relation to the rolled-greasy state of more than 5 and reaches luminance value of greater than 40 while measuring the color of the surface in the CIE L*a*b* color space using a standard illuminant D65 and an observation angle of 10°, excluding direct reflection in 45°/0° geometry.

2. The aluminum alloy strip or sheet according to claim 1, wherein
the aluminum alloy strip or sheet is at least one of intermediately and finally annealed.

3. The aluminum alloy strip or sheet according to claim 1, wherein
the aluminum alloy strip or sheet exhibits a thickness of 0.05 mm to 0.9 mm.

\* \* \* \* \*